United States Patent [19]

Balázs et al.

[11] 4,418,715
[45] Dec. 6, 1983

[54] PRESSURE LIMITING VALVE, PARTICULARLY FOR HYDRAULIC MINE PROPS

[75] Inventors: Karoly Balázs, Budapest, Hungary; Vladislav D. Firstov, Moscow, U.S.S.R.; Miklos Frcska, Budapest, Hungary; Laszlo Gal; Sàndor Hlavay, both of Balassagyarmat, Hungary; Lajos Huber, Budapest, Hungary; Jozsef Korbuly, Budapest, Hungary; Laszlo Mahig, Budapest, Hungary; Juri F. Ponomarenko; Juri G. Shein, both of Moscow, U.S.S.R.; Ferenc Simon, Budapest, Hungary

[73] Assignees: Központi Banyaszati Fejlesztesi Intezet; Magyar Aluminiumipari Troszt, both of Budapest, Hungary; Skotchinsky Institut Gornogo Dela, Moscow, U.S.S.R.

[21] Appl. No.: 292,195

[22] Filed: Aug. 12, 1981

[51] Int. Cl.³ .............................................. F16K 31/12
[52] U.S. Cl. ....................................... 137/508; 137/529
[58] Field of Search ............................... 137/508, 529

[56] References Cited

U.S. PATENT DOCUMENTS 3,036,593  5/1962  Saville ........................... 137/508 X
3,050,078  8/1962  Hooper ........................... 137/508 X
3,856,043  12/1974  Feild ................................. 137/508
4,074,695  2/1978  Weirick ............................. 137/508

FOREIGN PATENT DOCUMENTS 600674  12/1959  Italy ..................................... 137/508

Primary Examiner—Harold W. Weakley
Attorney, Agent, or Firm—Karl F. Ross; Herbert Dubno

[57] ABSTRACT

The invention relates to a pressure limiting valve, mainly for hydraulic mine props, which has a working space with an inlet opening connected to a high-pressure space and an outlet opening connected to low-pressure space in the operative position of the valve, a displaceable first valve member engageable with a valve seat within this working space in the shut-off position of the valve, a spring pressing the first valve member to the valve seat and in a given case, a spring sustaining the valve seat, suitably a gas spring and in which according to the invention the first valve member has transfer passages ensuring communication between the inlet opening and the outlet opening in the open position of the valve, as well as second valve member provided with a frustoconical head facing the cover plate and having a stem loosely fitted in a guide bore formed in the first valve member which is formed with an annular axial flange surrounding the head of the second valve member which is concentrically arranged within this flange.

4 Claims, 1 Drawing Figure

U.S. Patent  Dec. 6, 1983  4,418,715
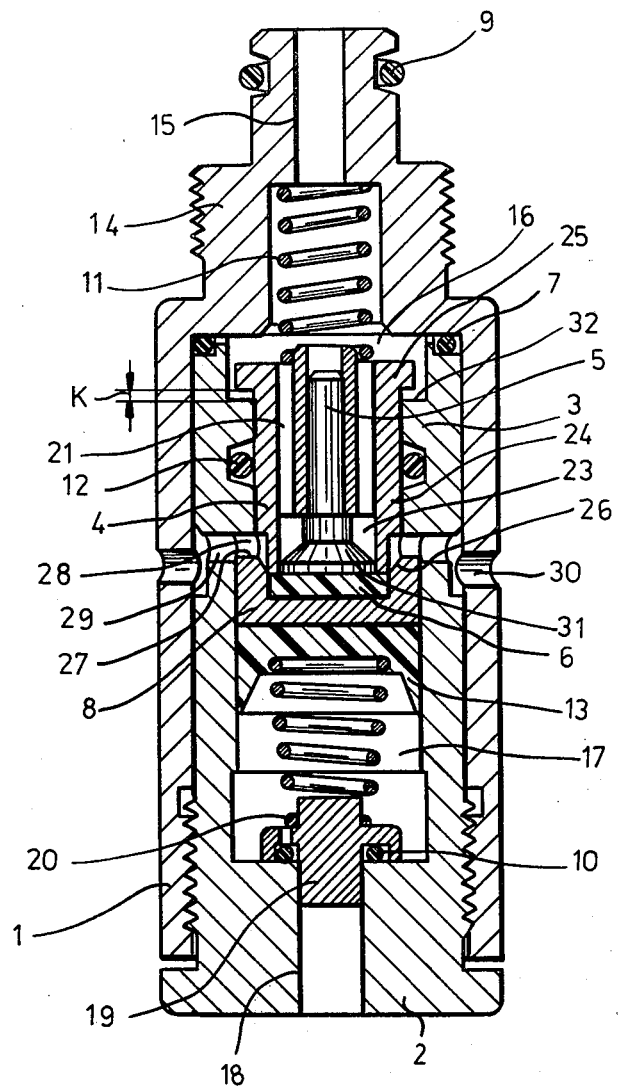

PRESSURE LIMITING VALVE, PARTICULARLY FOR HYDRAULIC MINE PROPS

FIELD OF THE INVENTION

The invention relates to pressure limiting valves, particularly for hydraulic mine props.

BACKGROUND OF THE INVENTION

Such pressure limiting valves are known for hydraulic mine props, which valves in operative position have a working space provided with an inlet opening connected with the high-pressure space and outlet opening connected with the low-pressure space of the mine prop, the working space has a sealed movable part with a valve seat, as well as a cover plate fitted to the valve seat in a closed condition, and a spring that presses the movable part against the cover plate and a spring sustaining the cover plate, suitably a gas spring.

In these known valves, the valve seat rests on the cover plate made of elastic synthetic material. The valve seat forms an annular orifice, through which the actuating liquid of higher pressure than permissible flows from the high-pressure space of the hydraulic prop into the low-pressure space, when the valve seat—under the influence of the opening force exceeding the set closing force—moves away from the cover plate.

In this known valve, the annular orifice of the valve seat is formed by a cylindrical plug loosely fitted into the opening formed in the movable part. The drawback of this solution is that the cylindrical plug may move in a lateral direction, thus the width of the annular orifice along the circumference is not constant. A greater force acts on the cover plate, made of elastic synthetic material, along the wider orifice section, which then takes up an oblique position, since it is supported only by a packing element surrounding the gas space that forms the gas spring, the packing element being formed as an elastic "bell". Owing to the oblique position, the actuating liquid flows out through a section of the annular orifice with higher velocity and at higher pressure. The outflowing actuating liquid exposes a certain part of the cover plate and "bell" behind it to intensive erosion effects, wearing it out, as a result of which they lose their closing and sealing capacity, and the pressure limiting valve becomes inoperative.

At the same time the oblique position of the cover plate entails the unfavorable consequence, whereby the valve does not open at the set required pressure value, thus its functioning is no longer reliable even while operative.

A further deficiency of the known pressure limiting valve is that the breakdown of the bell-shaped packing element that supports the cover plate also means the breakdown of the gas spring at the same time, since liquid flows into the gas space, reducing its elasticity and operating capacity partially or completely. This may occur mainly when suddenly high rock pressure acts on the mine prop, causing such a large quantity of liquid to flow out through the orifice of the valve seat within a short time, that it can not pass out fast enough through the outlet opening, therefor it flows through the defective packing element partly into the gas space.

OBJECTS OF THE INVENTION

The present invention is directed towards the elimination of the above deficiencies of the known pressure limiting valves.

Another object of the invention is to provide a pressure limiting valve particularly for hydraulic mine props, where the width of the annular orifice of the valve seat along the circumference is constant under any circumstances, for eliminating local erosion arising from the uneven load of the cover plate.

A further object of the invention is to reduce the sensitivity of the cover plate against the load arising from the dynamic flow of the actuating liquid.

A still further object of the invention is to eliminate possible damage of the gas spring arising from the inflow of the actuating liquid in the case of high dynamic loading.

SUMMARY OF THE INVENTION

The primary object is achieved in a pressure limiting valve, particularly for hydraulic mine props, in which the valve has a working space with an inlet opening connected to a high-pressure source in its operative position and an outlet opening connected with a low-pressure space, a sealed first slideable valve member engageable with a flat valve seat in the shut-off position of the valve, a spring pressing the first valve member against the valve seat and another spring sustaining the valve seat, suitably a gas spring, and in which according to the invention, the valve member has transfer passages to ensure the connection between the inlet opening and outlet opening in the open position of the valve, as well as a supporting stem provided with a frustoconical head forming a second valve member facing the valve seat, the stem being loosely fitted into the guide bore formed in the first member, which has an annular axial flange in which the head of the second member is concentrically arranged.

In a preferred embodiment of the valve according to the invention, the valve seat is recessed into a supporting element formed as a displaceable piston.

In another preferred embodiment, a packing element is fitted to the side of the supporting element opposite the valve seat, sealing the gas space that forms the gas spring.

In a further preferred embodiment, the first valve member mobile has a stop element, suitably a radial contact flange—which engages a counter-stop in the pressure releasing condition by the spring that presses the first member to the valve seat.

It is advantageous when the first member is arranged in the bore of a guide sleeve and the counter-stop is a shoulder formed around this bore.

It is also advantageous when the supporting element has a deflecting surface conically expanding outward from the edge of the valve seat in the direction of the first member. It is a further advantage when the frustoconical head of the second valve member conically expands in the direction of the valve seat and the end at the valve seat is flat.

In a further preferred embodiment, the supporting element carrying the valve seat has an axial flange provided with radial openings, which in the shut-off position of the valve is in contact with the guide sleeve receiving the first valve seat.

Finally, it is advantageous when the first valve member has several axial transfer passages leading to the conical surface of the head opposite the valve seat.

The main advantage of the pressure limiting valve according to the invention is that the width of the annular orifice is constant along the circumference under any conditions, since this is determined by the annular flange of the first valve member and by the frustoconical head of the second valve member being concentric with the flange.

At the same time, the frustoconical head of the first member radially deflects the actuating liquid flowing through the transfer passages of the second member, whereby the dynamic load on the valve seat is reduced. The valve seat supporting element as well as the conically outward-expanding deflecting surface of this supporting element also act in this sense.

Because of the radial deflecton of the actuating liquid and use of the valve seat carrier supporting element, the gas spring-forming gas space is increasingly protected against penetration thereof by the actuating liquid arising at dynamic load.

In certain embodiments, the valve seat is not loaded by pressure of the gas spring in the unloaded condition of the valve, but starting from a certain value, the closing force constantly increases until the opening of the valve, which increases the reliability of the valve.

BRIEF DESCRIPTION OF THE DRAWING

The invention is described by way of example with the aid of the sole FIGURE of drawing, which illustrates a longitudinal section of a pressure limiting valve according to the invention.

SPECIFIC DESCRIPTION

The pressure limiting valve has a hollow cylindrical housing 1, one end of which is provided with axial inlet opening 15 and external thread 14. The valve is connectible by the thread 14 to the high-pressure space of a hydraulic prop (not shown), and sealed by a packing ring 9, arranged in a circular groove formed around the inlet opening 15.

A blocking element 2 of cylindrical plug shape is threaded into the other end of the housing 1, the outer end of which is provided with axial passage 18. The blocking element 2 has a cylindrical gas space 17, one end of which is connected to passage 18, while the other end is sealed with a bell-shaped packing element 13. The gas space side of the packing element 13 is cup shaped, the external surface is cylindrical, and fitted to the wall of the inner cavity of the blocking element 2, while its side opposite the gas space 17 is flat and perpendicular to the longitudinal axis. Coil spring 20 is arranged in the gas space 17, resting partly on the valve collar 19 provided with packing ring 10 and closing the passage 18, and partly on the bell-shaped packing element 13.

A supporting element 8 is shaped as a free displaceable piston, fitted to the flat side of the packing element 13 opposite the gas space 17, the other side of which is recessed and carries a flat disk-shaped valve seat 6 made of elastic synthetic material. The supporting element 8 around the valve seat 6 has a conically outward expanding deflecting surface 26, from which an axial flange 27 extends in the direction of the valve's inlet opening 15. The flange 27 is provided with radial openings 28 and rests against one of the end faces of the cylindrical plug-shaped guide sleeve 3 fitted into the cylindrical cavity of housing 1. The inner end of the blocking piece 2 is supported similarly by the guide sleeve 3 and its seating end is provided with radial perforations 29. In communication with openings 28 and 29, outlet openings 30 are formed in the wall of housing 1.

The guide sleeve 3 has an axial bore in which the cylindrical sliding first valve member 4 sealed with packing ring 12 is guided. Guide sleeve 3 in relation to housing 1 is sealed with further packing ring 7. A stepped, cylindrical working space 16 is formed in housing 1 between the valve member 4 and inlet opening 15, in which spring 11 is arranged driving the mobile part 4 towards the valve seat 6.

The valve seat 4 has axial transfer passages 21 ensuring communicating connection between the working chamber 16 and space 23 leading to the outlet opening 30. The valve member 4 has a central axial guide bore as well, in which the stem of a second valve member 5 is loosely fitted. The stem of member 5 has a frustoconical head 31, conically expanding in the direction of the valve seat 6, the side facing the cover plate 6 formed as a flat surface perpendicular to the longitudinal axis.

The valve member 4 has a stop element 25 formed as a radial circular contact flange in the working space 16, which in the stationary shut-off position of the valve is situated at a distance K in axial direction from the counter-stop 32 formed as a circular inner shoulder at the outlet opening end of the guide sleeve 3.

The end of the valve member 4 at the valve seat 6 is formed as an annular flange 24, concentrically surrounding the head 31 of the valve member 5. There is an annular orifice formed between the head 31 and flange 24 in the open position of the valve.

The pressure limiting valve functions as follows:

The gas spring formed by gas space 17 being filled with neutral gas through passage 18 corresponding to the required pressure, presses the valve seat 6 carried by supporting element 8 to the circular axial flange 24 of the valve member 4 until the flange 27 of the supporting element 8 contacts the face of guide sleeve 3. This way the gas spring does not load the cover plate 6 in an unloaded condition of the valve. The force by which the flange 24 of the valve member 4 presses the cover plate 6 in an unloaded condition of the valve is determined exclusively by spring 11.

The flat side of the frustoconical head 31 of valve member 5 in this position just bears on the valve seat 6. The annular orifice between the head 31 and flange 24 of the valve member 4 is closed by the elastic valve seat 6, thus the high-pressure working space 16 through transfer passages 21 and space 23 is not to communicate with the outlet opening 30 through openings 28 and perforations 29. In this state, distance K exists in an axial direction between the stop element 25 of the mobile part 4 and counterstop 32 of the guide sleeve 3.

When under the influence of slowly increasing pressure, actuating liquid flows through inlet opening 15 into the working space 16, and the valve member 4 gradually moves in the direction of the gas space 17 and removes the flange 27 of the supporting element 8 from the face of guide sleeve 3. From here on with increase of the actuating liquid's pressure the closing force acting between the valve seat 6 and flange 24 increases as well, since the volume of the gas space 17 decreases and the supporting element 8 no longer bears on the face of guide sleeve 3.

When under the influence of the increasing pressure, the stop element 25 contacts the counterstop 32, distance K decreases to 0, the valve seat 6 moves away from flange 24, and the actuating liquid flows out of the working space 16 through transfer passages 21 and chamber 23, and through the gap between head 31 and flange 24, as well as between the valve seat 6 and flange 24, and through opening 28, perforations 29 and outlet opening 30.

At sudden dynamic increase of the actuating liquid pressure, operation of the valve changes in so far as the valve member 5 provided with frustoconical head 31, which is ejected from chamber 23, its conical surface deflecting the actuating liquid flowing at high pressure and velocity from the valve seat 6 in a radial direction. The actuating liquid is deflected further by conical surface 26 of the supporting element 8 towards opening 28, through which it passes off in the direction of perforation 29 and outlet opening 30. This way the valve seat 6 is freed from the erosive effects arising from the dynamic load, and the high-pressure actuating liquid is prevented from entering the gas space 17.

We claim:

1. A pressure limiting valve comprising:
    an elongated housing having an axially spaced apart high pressure fluid inlet opening and a fluid outlet opening;
    a flat valve seat axially displaceable in said housing and disposed between said inlet and outlet openings;
    a first chamber formed in said housing on one side of said valve seat and provided with an inlet passage for the introduction of a pressurized gas into said first chamber, said inlet passage being provided with a spring-loaded closure member for retaining said pressurized gas within said first chamber to act against said valve seat;
    a first limitedly axially displaceable valve member provided on the other side of said valve seat from said first chamber between said seat and said inlet opening, said first valve member being formed with an annular axial flange portion biased against said valve seat in an outlet blocking position by a spring bearing against said first member, said annular axial flange defining with said valve seat a second chamber, said second chamber communicating with said inlet opening through a plurality of axial passageways formed in said first valve member; and
    a second axially displaceable valve member guided in said first member and having a frustoconical head disposed in said second chamber concentrically with said annular axial flange, said head having a flat end engageable with said valve seat for displacing same against the force of the pressurized gas in said first chamber out of engagement with said first valve member to unblock said outlet opening for enabling high pressure fluid to flow from said inlet opening to said outlet opening.

2. The valve defined in claim 1, further comprising:
    a support element formed as a piston disposed between said valve seat and said first chamber and mutually axially displaceable with said valve seat, said piston having a recess in which said valve seat rests; and
    a packing element adjacent said support element and mutually axially displaceable therewith and facing said first chamber for providing a gas seal therefore, said valve seat and said packing element being made of a synthetic resin material.

3. The valve defined in claim 2 wherein said second valve member is formed with an axially extending stem guided in a bore provided in said first valve member, said frustoconical head of said second member expanding toward said valve seat and having substantially the same diameter as the inside of said annular axial flange for preventing the leakage of the high pressure fluid beyond said head in a closed position of said limiting valve, said first valve member being provided with a radial flange coacting with a stop provided in said housing for enabling said head of said second valve member to be axially displaced by the fluid beyond said annular flange and to form therewith an annular orifice in an open position of said limiting valve.

4. The valve defined in claim 2 wherein said recess in said support element is annular and has substantially the same diameter as the outside of said annular axial flange for interfitting contact therewith in the closed position of said limiting valve.

* * * * *